US008355732B2

(12) United States Patent
Gabriel et al.

(10) Patent No.: US 8,355,732 B2
(45) Date of Patent: Jan. 15, 2013

(54) METHOD OF DIMENSIONING A TRANSPORT NETWORK FOR A RADIO ACCESS NETWORK OF A MOBILE RADIO NETWORK

(75) Inventors: Anne Gabriel, Paris (FR); Frédéric Le-Beyec, Magny les Hameaux (FR); Christophe Pepin, Versailles (FR)

(73) Assignee: Alcatel Lucent, Paris (FR)

( * ) Notice: Subject to any disclaimer, the term of this patent is extended or adjusted under 35 U.S.C. 154(b) by 1515 days.

(21) Appl. No.: 10/740,803

(22) Filed: Dec. 22, 2003

(65) Prior Publication Data

US 2004/0132453 A1 Jul. 8, 2004

(30) Foreign Application Priority Data

Dec. 24, 2002 (FR) ...................................... 02 16612

(51) Int. Cl.
*H04W 40/00* (2009.01)
(52) U.S. Cl. ........ 455/446; 455/423; 455/453; 455/450; 455/552; 370/209; 370/331; 370/328; 370/338; 370/349
(58) Field of Classification Search .................. 455/446, 455/423, 453, 522, 522.1; 370/230, 389, 370/252, 477, 209, 331, 328, 338, 349, 468, 370/465, 392, 335; 709/226
See application file for complete search history.

(56) References Cited

U.S. PATENT DOCUMENTS

| | | | |
|---|---|---|---|
| 6,069,871 A * | 5/2000 | Sharma et al. ................. | 370/209 |
| 6,069,872 A * | 5/2000 | Bonomi et al. ................ | 370/236 |
| 6,216,006 B1 | 4/2001 | Scholefield et al. | |
| 6,266,531 B1 * | 7/2001 | Zadeh et al. ................... | 455/453 |
| 6,374,112 B1 * | 4/2002 | Widegren et al. ........... | 455/452.2 |
| 6,408,185 B1 * | 6/2002 | Freeman et al. ............... | 455/446 |
| 6,442,139 B1 * | 8/2002 | Hosein ........................... | 370/236 |
| 6,542,516 B1 * | 4/2003 | Vialen et al. ................... | 370/465 |
| 6,668,175 B1 * | 12/2003 | Almgren et al. .............. | 455/522 |
| 6,738,625 B1 * | 5/2004 | Oom et al. ...................... | 455/453 |
| 6,904,058 B2 * | 6/2005 | He et al. ......................... | 370/477 |
| 6,944,459 B2 * | 9/2005 | Parantainen et al. ........ | 455/452.1 |
| 7,106,700 B2 * | 9/2006 | Freiberg et al. ................ | 370/252 |
| 7,573,862 B2 * | 8/2009 | Chambers et al. ............ | 370/349 |

(Continued)

FOREIGN PATENT DOCUMENTS

WO WO 02 056564 7/2002
WO WO 02 080602 10/2002

OTHER PUBLICATIONS

Seshu Madhavapeddy et al, "The Design of Self Engineering Mobile Telephone Systems", ISS '95. World Telecommunications Congress. International Switching Symposium. Advanced Switching Technologies for Universal Telecommunications at the Beginning of the 21$^{st}$. Berlin, Apr. 23-28, 1995, Proceedings of the International SWIT, vol. 1 Symp. 15, Apr. 23, 1995, pp. 426-430. XP000495607.

*Primary Examiner* — Kiet Doan
*Assistant Examiner* — Michael T Vu
(74) *Attorney, Agent, or Firm* — Sughrue Mion, PLLC (57) ABSTRACT

The present invention provides a method of dimensioning a transport network for a radio access network of a mobile radio network, said method including dynamic adaptation of the transport configuration as a function of transport traffic capacity requirements.

19 Claims, 3 Drawing Sheets

U.S. PATENT DOCUMENTS

| | | | |
|---|---|---|---|
| 2002/0087370 A1* | 7/2002 | Brueckheimer et al. | 705/7 |
| 2002/0102981 A1 | 8/2002 | Jechoux | |
| 2002/0165966 A1* | 11/2002 | Widegren et al. | 709/226 |
| 2003/0039246 A1* | 2/2003 | Guo et al. | 370/389 |
| 2003/0172160 A9* | 9/2003 | Widegren et al. | 709/226 |
| 2004/0032828 A1* | 2/2004 | Satt et al. | 370/230 |

* cited by examiner

FIG_2

|  | P1 | P2 | P3 | P4 | P5 |
|---|---|---|---|---|---|
| S1 | 41.60 | 41.60 | Circuit | 128 | 128 |
| S2 | 0.84 | 27.97 | Packet | 384 | 384 |
| S3 | 23.81 | 23.81 | Packet | 14 | 14 |
| S4 | 178.33 | 178.33 | Circuit | 16 | 16 |

FIG_3

| P'1 | 12786 |
|---|---|
| P'2 | 272 |

FIG_4

| P''1 | 32 |
|---|---|
| P''2 | 109 |
| P''3 | 120 |
| P''4 | 32 |
| P''5 | 13208 |
| P''6 | 15000 |

FIG_5

METHOD OF DIMENSIONING A TRANSPORT NETWORK FOR A RADIO ACCESS NETWORK OF A MOBILE RADIO NETWORK

FIELD OF THE INVENTION

The present invention relates generally to mobile radio systems.

The present invention is applicable in particular to third generation mobile radio systems, especially the Universal Mobile Telecommunications System (UMTS).

BACKGROUND OF THE INVENTION

As a general rule, mobile radio systems are covered by standards, and the corresponding standards published by the corresponding standards bodies may be referred to for more information.

Figure 1:
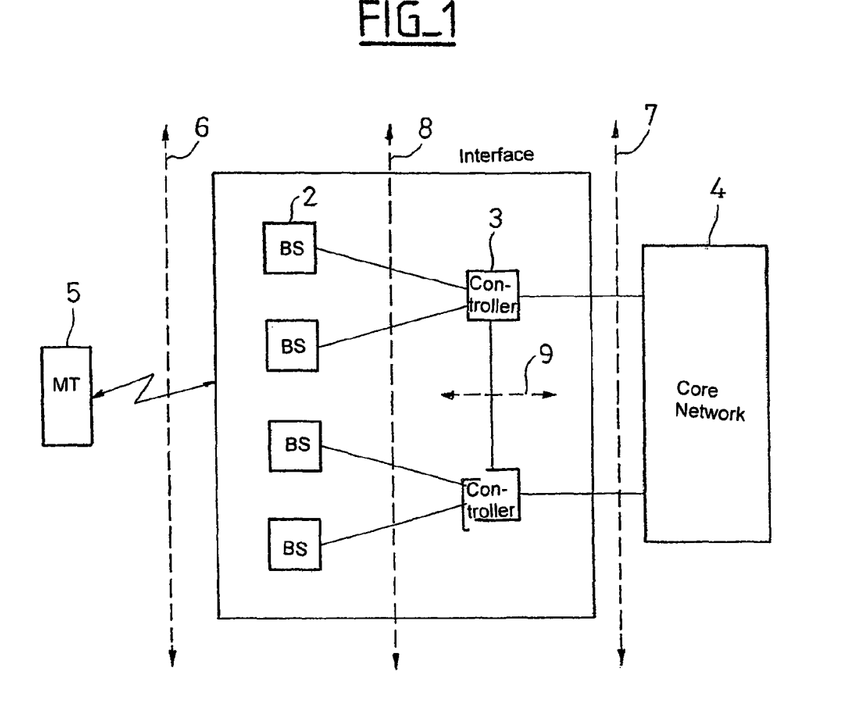
FIG. 1 shows the general architecture of a mobile radio system.

FIG. 1 outlines the general architecture of a mobile radio system, which essentially comprises:
 a radio access network (RAN) 1, and
 a core network (CN) 4.

The RAN comprises network elements such as base stations 2 and base station controllers 3. The RAN communicates with mobile terminals 5 via an interface 6 and with the CN 4 via an interface 7. The CN 4 communicates with external networks (not specifically shown). Inside the RAN, the base stations 2 communicate with the base station controllers 3 via an interface 8.

In the UMTS, which is a third generation system, the RAN is called the UMTS Terrestrial Radio Access Network (UT-RAN), a base station is called a Node B, a base station controller is called a Radio Network Controller (RNC) and a mobile terminal is called a User Equipment (UE). The interface 6 is called the Uu interface, the interface 7 is called the Iu interface and the interface 8 is called the Iub interface; there is also an interface 9 between RNCs, called the Iur interface. The CN contains in particular Mobile Switching Center (MSC) network elements 10 used for circuit mode connections and Serving General Packet Radio Service (GPRS) Node (SGSN) network elements 11 used for packet mode connections. The RNC/MSC interface is also called the Iu-CS interface, where CS stands for "circuit-switched", and the RNC/SGSN interface is also called the Iu-PS interface, where PS stands for "packet-switched". The interface Uu is also called the radio interface and the Iub, Iur, and Iu (Iu-CS, Iu-PS) interfaces are also called terrestrial interfaces.

The RNC controlling a given Node B is called the Controlling Radio Network Controller (CRNC). The CRNC has a load control and radio resource allocation role for each Node B that it controls and the cells covered by those Nodes B. For a given call relating to a given UE, there is a Serving Radio Network Controller (SRNC) having a control role in relation to the call concerned. A Node B connected to the UE but not controlled by the SRNC communicates with the SRNC via the RNC controlling it, which is also known as the Drift RNC (DRNC), and via the Iur interface.

The network elements of the RAN are interconnected by a transport network, not specifically shown in FIG. 1. A logical link within the transport network enables two network elements to communicate via one of the terrestrial interfaces Iub, Iur, and Iu (Iu-CS, Iu-PS).

As a general rule, systems of the above kind must be able to support traffic whose Quality of Service (QoS) requirements can differ greatly from one traffic to another. The QoS architecture in a system such as the UMTS is defined in particular in the Technical Specification TS 23.107 published by the 3$^{rd}$ Generation Partnership Project (3GPP). This QoS architecture is based on support services characterized by QoS attributes. Different support services are distinguished, such as in particular Radio Access Bearer (RAB) services, Radio Bearer (RB) services, and Iu bearer services. Different QoS attributes are distinguished, such as in particular the traffic class, the maximum bit rate, the guaranteed bit rate, the transfer delay, the traffic handling priority, etc. Four traffic classes are further distinguished, respectively for conversational, streaming, interactive, and background applications. It is also possible to distinguish circuit mode services or real-time services (such as voice services in particular), for which the traffic class is generally the conversational class, which is the most demanding in terms of transfer delay, and packet mode services, or non-real time services (such as in particular web browsing services, electronic mail (e-mail) services, etc.), for which the traffic class is generally a class other than the conversational class, and less demanding in terms of transfer delay.

As a general rule, a model has been defined for the communications protocols at the terrestrial interfaces which makes a distinction between a radio network layer corresponding to functions relating to radio access, independently of the technology used for transport at the terrestrial interfaces, and a transport network layer corresponding to functions associated with transport, and depending on the technology used for transport at the terrestrial interfaces. Furthermore, a user plane and a control plane are distinguished for each of these layers, the two planes corresponding to two types of data that can be communicated in accordance with the above protocols, namely data corresponding to traffic sent or received by a UE (user data) and data corresponding to signaling (or control data) necessary to the operation of the system. Two types of signaling can also be distinguished, namely signaling associated with the radio network layer and signaling associated with the transport network layer.

The signaling relating to the radio network layer corresponds in particular to the following protocols, which are also known as application protocols:
 for the Iu interface, the Radio Network Application Part (RANAP) protocol, defined in particular in Technical Specification TS 25.413 published by the 3GPP,
 for the Iub interface, the Node B Application Part (NBAP) protocol, defined in particular in Technical Specification TS 25.433 published by the 3GPP, and
 for the Iur interface, the Radio Network Subsystem Application Part (RNSAP) protocol, defined in particular in Technical Specification TS 25.423 published by the 3GPP.

The RANAP protocol covers in particular signaling relating to Radio Access Bearer (RAB) set-up. The NBAP protocol covers in particular signaling relating to radio link set-up for cells controlled by the SRNC. The RNSAP protocol covers in particular signaling relating to radio link set-up for cells controlled by the DRNC.

As a general rule, transport at the terrestrial interface level is in packet mode. Remember that in circuit mode the transmission resources are assigned in a fixed manner to different users, whereas in packet mode the transmission resources are shared at any given time by different users, which makes it possible to optimize the use of available transmission resources. However, packet mode implies the possibility of congestion and packet loss. Techniques such as connection admission control in particular are generally used to prevent congestion and thereby to guarantee the QoS within the transport network.

One transport technology used in the UTRAN is the Asynchronous Transfer Mode (ATM) technology based on asynchronous time-division multiplexing of small packets of fixed size known as cells. As a general rule, the ATM technology is covered by standards and the corresponding standards published by the corresponding standards bodies may be referred to for more information. Remember simply that an ATM network can be modeled by means of an ATM layer and an ATM Adaptation Layer (AAL) between the ATM layer and users. The ATM layer is connection-oriented and transmits cells between a source and a destination over a logical connection that is also referred to as a Virtual Channel (VC). A plurality of virtual channels can be grouped together to form a Virtual Path (VP). To apply the ATM technology to transport within the UTRAN, a dedicated AAL layer, called the AAL2 layer, is used for user data. When a UE communicates with the UTRAN, a corresponding AAL2 logical connection is set up at one or more of the terrestrial interfaces concerned of the UTRAN.

In the case of the ATM technology, the signaling relating to the transport network layer includes the Access Link Control Application Part (ALCAP) protocol as defined in particular in specifications Q.2360-1 and Q.2360-2 published by the International Telecommunications Union (ITU-T).

Technologies other than the ATM technology can be used in the transport network, such as in particular the Internet Protocol (IP) technology. As a general rule, the IP technology is also covered by standards, and the corresponding standards published by the corresponding standards bodies may be referred to for more information.

As a general rule, it is very important to dimension these networks correctly, in particular the RAN, to optimize quality of service for users and costs for the operator. If a network is overdimensioned, the QoS is generally guaranteed for users, but this is not generally economic for the operator, since transmission resources are then provided or reserved that may not be used. Conversely, if a network is underdimensioned, this is generally more economic for the operator but less acceptable for users, since the QoS may not be guaranteed.

In the same way as a distinction is drawn between the radio network and the transport network, it is possible to draw a distinction between the dimensioning of the radio network and the dimensioning of the transport network.

The particular problem for dimensioning the radio network is that of determining the density of cells, their capacity or configuration (including for a Node B, for example, its processing capacity or hardware configuration, the number of bearers assigned, etc.), and parameters that can be configured by the operator (such as handover, power, admission, and load control parameters, for example), etc. More generally, the problem is that of determining any element or parameter for dimensioning the radio network, in particular in terms of capacity, coverage, and quality of service.

The particular problem in dimensioning the transport network is that of determining the capacity or configuration of the logical links corresponding to the Iub, Iur, and Iu (Iu-CS, Iu-PS) interfaces. More generally, the problem is that of determining any element or parameter for dimensioning the transport network, in particular in terms of capacity and quality of service.

Initial dimensioning, prior to commissioning, is generally effected during a preliminary planning phase. Dimensioning can be optimized after commissioning. To this end, network observations or measurements can be effected on the network when in operation and the dimensions of the network modified or adapted accordingly.

These dimensioning problems have been the subject of a great deal of research, examples of which may be found in the literature. However, this research generally relates dimensioning the radio network, and not to dimensioning the transport network. Moreover, these dimensioning problems are generally more complex to solve for third generation systems than for second generation systems. In particular, the Universal Mobile Telecommunications System (UMTS), which is a third generation system, uses a Code Division Multiple Access (CDMA) radio access technology, whereas the Global System for Mobile communications (GSM), which is a second generation system, uses a Time Division Multiple Access/Frequency Division Multiple Access (TDMA/FDMA) radio access technology. Furthermore, second generation systems use transport technologies based on circuit mode whereas third generation systems use transport technologies based on packet mode.

SUMMARY OF THE INVENTION

One particular object of the present invention is to propose a solution to the problem of dimensioning the transport network that is applicable in particular to third generation systems, such as the UMTS in particular, and optimizes performance, in particular in terms of quality of service for users and cost for the operator. Another advantage of a dimensioning method of the invention is that it is accurate, fast and economic for the operator.

The present invention consists in a method of dimensioning transport networks for radio access networks of mobile radio networks, said method comprising dynamic adaptation of the transport configuration as a function of transport traffic capacity requirements.

According to another feature, to determine the transport traffic capacity requirements, account is taken of one or more criteria from a set of criteria including:
  the radio traffic capacity requirements of users,
  the capacity of the network to handle the radio traffic, and
  the transport quality of service.

According to another feature, to determine the transport traffic capacity requirements on a logical link of said transport network, account is taken of one or more criteria from a set of criteria including:
  the radio traffic capacity requirements of users, in the case of cells attached to said logical link,
  the capacity of the network to handle the radio traffic, in the case of cells attached to said logical link, and
  the quality of service on said logical link.

According to another feature, to determine the radio traffic capacity requirements of users, account is taken:
  during initial dimensioning, of the radio traffic forecasts, and
  subsequently, after commissioning, of radio traffic observations.

According to another feature, to determine the capacity of the network to handle the radio traffic, account is taken of:
  during initial dimensioning, cellular radio dimension forecasts and forecasts of the capacity of the network nodes to process the radio traffic, and
  subsequently, after commissioning, changes in the cellular radio dimensions and/or changes in the capacity of the network nodes to process the radio traffic.

According to another feature, to determine the transport traffic capacity requirements, account is taken during initial dimensioning of the radio traffic capacity requirements of users and of the capacity of the network to handle the radio traffic.

According to another feature, to determine the transport traffic capacity requirements, account is taken after commissioning of the radio traffic capacity requirements of users and/or the capacity of the network to handle the radio traffic and/or the transport quality of service.

According to another feature, the radio traffic capacity requirements of users in a cell are expressed by means of a traffic model or descriptor.

According to another feature, a traffic descriptor is defined by one or more parameters including, for each of the uplink and downlink directions:
the number of users active simultaneously in that cell,
the type of service (circuit or packet) required by said users, and
the bit rate for the services required by said users.

According to another feature, the transport traffic capacity requirements on a logical link are expressed by means of a traffic model or profile.

According to another feature, a transport traffic profile on a logical link is defined by one or more parameters including:
the minimum bandwidth necessary for dimensioning the user plane for the communications protocols on said logical link, and
the maximum number of users necessary for dimensioning the control plane for the communications protocols on said logical link.

According to another feature, the dimensioning of a transport network logical link is defined by a transport configuration model or template.

According to another feature, a transport configuration template for a transport network logical link is defined by one or more parameters including:
the bandwidth necessary for said logical link, and,
the assignment of said bandwidth to different traffic liable to be transmitted on said logical link, including user data traffic, signaling traffic relating to the radio network layer, and signaling traffic relating to the transport network layer, in accordance with the communications protocols on said logical link.

According to another feature, the transport traffic capacity requirements on a logical link of the transport network can be deduced from the transport traffic capacity requirements on one or more other logical links of the transport network.

According to another feature, said method includes the following steps:
a first step of expressing the requirements of users in terms of radio traffic capacity in a cell, by means of a traffic descriptor for that cell,
a second step of expressing traffic capacity requirements on a logical link of the transport network by means of a traffic profile, based on traffic descriptors for all of the cells attached to said logical link, and
a third step of choosing a transport configuration template for a logical link of the transport network, based on the traffic profile for said logical link.

According to another feature, the second and third steps apply a formula of the type:

$T = f(\Sigma c_i)$ in which:
T is the transport configuration template chosen for said logical link,
$\Sigma c_i$ represents the sum of the traffic descriptors $c_i$ for all the cells attached to said logical link, and
f represents a function for deducing the transport configuration model T from traffic descriptors $c_i$ of all cells attached to said logical link.

According to another feature, the second and third steps take account of the aggregate traffic of all the cells attached to said logical link, instead of the sum of the individual traffics of all the cells.

According to another feature, said method includes a step for choosing a transport configuration template as a function of one or more criteria from a set of criteria including:
the radio traffic capacity requirements of users,
the capacity of the network to handle the radio traffic, and
the transport quality of service.

According to another feature, said transport configuration template is chosen from a set of predetermined transport configuration templates or reference templates.

According to another feature, said method further includes dynamic adaptation of the reference templates as a function of transport traffic capacity requirements.

The present invention also proposes a mobile radio network operation and maintenance center including means for implementing a method of the above kind.

BRIEF DESCRIPTION OF THE INVENTION

Other objects and features of the present invention will become apparent on reading the following description of one embodiment of the invention, which is given with reference to the appended drawings, in which.

DETAILED DESCRIPTION OF THE INVENTION

The present invention can also be explained in the following manner.

The invention provides dynamic adaptation of the transport configuration as a function of transport traffic capacity requirements.

Determining transport traffic capacity requirements can take into account one or more criteria from a set of criteria including in particular:
the radio traffic capacity requirements of users,
the capacity of the network to handle the radio traffic, and
the transport quality of service.

Accordingly, to determine the traffic capacity requirements on a logical link of said transport network, account can be taken of one or more criteria from a set of criteria including:
the radio traffic capacity requirements of users, in the case of cells attached to said logical link,
the capacity of the network to handle the radio traffic, in the case of cells attached to said logical link, and
the quality of service on said logical link.

Referring to a cell as being "attached" to a logical link means:
in the case of an Iub logical link (between a Node B and an RNC), a cell covered by that Node B,
in the case of an Iur logical link (between a SRNC and a DRNC), a cell covered by a Node B controlled by that DRNC, and
in the case of an Iu logical link (between a SRNC and the CN), a cell covered by a Node B controlled by that SRNC or by a DRNC connected to that SRNC via an Iur interface.

To determine user requirements in terms of radio traffic capacity, the following can be taken into account:
   during initial dimensioning, radio traffic forecasts, and subsequently, after commissioning, radio traffic observations.

To determine the capacity of the network to handle the radio traffic, the following can be taken into account:
   during initial dimensioning, forecasts of cellular radio dimensions and of the capacity of network elements to handle the radio traffic, and
   subsequently, after commissioning, changes of cellular radio dimensions and/or of the capacity of network elements to handle the radio traffic.

Cellular radio dimensioning relates to elements or parameters such as the number of cells, the number of carriers allocated, the parameters that can be configured by the operator (such as handover, power, admission, and load control parameters), etc.

The capacity of the radio access network elements to handle the radio traffic includes their radio traffic processing capacity such as, in particular, with reference to the standard organization of this processing into layers known as layer 1, layer 2 and layer 3:
   for a Node B, its layer 1 processing capacity, expressed as a number of baseband processing equipment cards, for example, and
   for an RNC, its layer 2 processing capacity, expressed as a number of equipment cards for the corresponding processing, for example.

The capacity of core network elements to handle the radio traffic includes their processing capacity for specific processing that may be effected in said network elements, such as in particular, for an MSC, its processing capacity for implementing a transcoding function, expressed for example as a number of corresponding equipment cards.

During original dimensioning, to determine the transport traffic capacity requirements on a logical link of the transport network, account can be taken of forecasts of user requirements in terms of radio traffic capacity in the cell or cells attached to the logical link, cellular radio dimensioning forecasts for said cells, and the capacity of network elements to handle this radio traffic, in particular because other data, such as transport QoS measurements on the logical link, is not yet available.

To determine the transport traffic capacity requirements after commissioning, it is then possible to take account of the radio traffic capacity requirements of users and/or the capacity of the network to handle the radio traffic and/or the transport quality of service.

The following distinction can also be made, and corresponds to different dimensioning strategies:
   according to a first strategy, a logical link can be dimensioned aggressively, in other words exactly, as a function of the radio traffic predicted or observed in the cells attached to the logical link; this first strategy is more economic for the operator, but less acceptable for users, as there is then the risk, if the actual radio traffic becomes greater than the radio traffic taken into account for dimensioning, that the QoS will not be guaranteed,
   according to a second strategy, a logical link can be dimensioned conservatively, as a function of the cellular radio dimensioning and the capacity of the network elements to handle the radio traffic; this second strategy is more acceptable for users (because this kind of dimensioning generally supports the actual traffic), but less economic for the operator, since in this case resources must be provided or reserved that may not be used.

The user requirements in terms of radio traffic capacity in a cell can be expressed by means of a traffic model or descriptor. A traffic descriptor for a cell can be defined by one or more parameters including in particular, for each of the uplink and downlink directions:
   the number of users active simultaneously in the cell,
   the type of service (circuit or packet) required by users, and
   the bit rate for the services required by users.

Traffic capacity requirements on a logical link can be expressed by means of a traffic model or profile defining the logical link for the transport network. A traffic profile for a logical link can be defined by one or more parameters including, in particular:
   the minimum bandwidth necessary for dimensioning the user plane for the communications protocols used on the logical link, and
   the number of users necessary for dimensioning the control plane for the communications protocols used on the logical link.

The dimensioning of a logical link can be defined by a transport configuration model or template. A transport configuration template can be defined by one or more parameters including:
   the bandwidth necessary for the logical link, and
   the assignment of that bandwidth to different traffic that can be transmitted on the logical link, including in particular user data traffic, signaling traffic relating to the radio network layer, and signaling traffic relating the transport network layer, according to the communications protocols on the logical link.

For example, in systems using the ATM transport technology, the bandwidth is that necessary for the virtual channels (VC) and the virtual paths (VP).

Another option is for the transport traffic capacity requirements on a logical link of the transport network to be deduced from the transport traffic capacity requirements on one or more other logical links of the transport network.

For example, to dimension an Iur logical link, it is also possible to consider the traffic on that Iur logical link as a proportion of the traffic on an Iu logical link. That proportion can depend on, for example:
   radio data (such as the proportion of mobile traffic on soft handover, the speed of mobiles, the radio environment),
   data relating to a traffic model (for example including the duration of calls, the multiplex of services considered for those calls, etc.), and
   the topology of the network (size of cells, number of cells per Node B, number of Nodes B per RNC, number of "adjacent" RNCs per RNC, an "adjacent" RNC being a RNC connected by an Iur interface to another RNC).

The soft handover proportion can typically vary from 5% to 30%.

An implementation of a method of the invention, which corresponds by way of example to the first dimensioning strategy previously mentioned, includes the following steps:
   a first step of expressing user requirements in terms of radio traffic capacity in a cell, by means of a traffic descriptor,
   a second step of expressing traffic capacity requirements on a logical link of the transport network by means of a traffic profile, based on traffic descriptors for all of the cells attached to that logical link, and
   a third step of choosing a traffic configuration template for a logical link of the transport network, based on the traffic profile for that logical link.

A first option is for the second and third steps to be effected by applying a formula of the type:

$$T = f(\Sigma c_i)$$

in which:

T is the transport configuration template chosen for a logical link, $\Sigma c_i$ represents the sum of the traffic descriptors $c_i$ for all the cells attached to the logical link, and f represents a function for deducing the transport configuration template T from the traffic descriptors $c_i$ for all the cells attached to the logical link.

In accordance with this first option, the radio traffic for all the cells considered is the sum of the individual traffic values of the various cells.

Another option is to take account of the aggregate traffic for all the cells attached to the logical link, instead of the sum of the individual traffic values for all the cells. The aggregate traffic is generally less than the sum of the individual traffic values for all the cells, because not all the cells are busy at the same time. This is true in particular when the number of cells is high. Transmission resources are saved if dimensioning is based on the aggregate traffic, rather than on the sum of the individual traffic values.

A UTRAN with an ATM-based transport layer is considered hereinafter by way of example only, and the problem addressed by way of example is that of the transport configuration of an Iub logical link.

Figure 2:
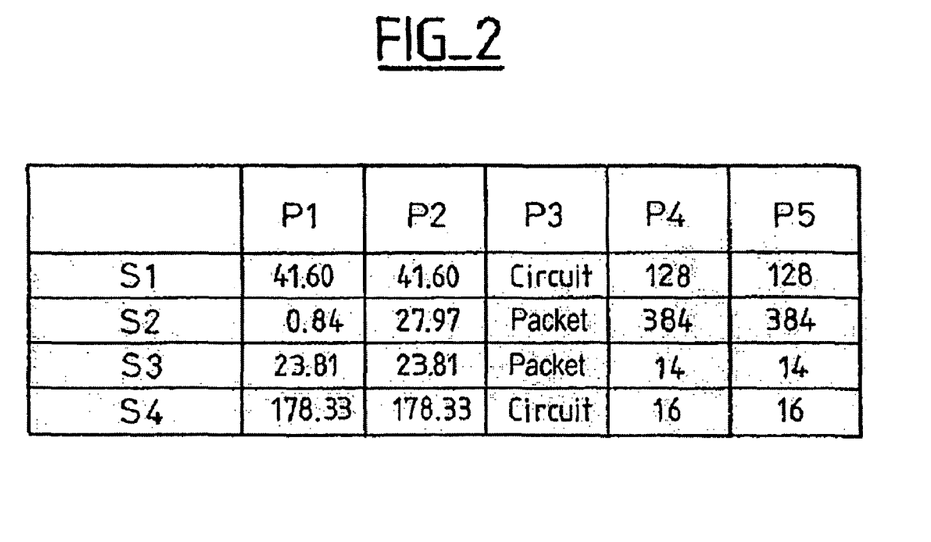
FIGS. 2 to 5 are diagrams illustrating examples of methods in accordance with the invention.

The table in FIG. 2 relates to an example of a traffic descriptor for a UMTS cell. The services considered by way of example are a videoconference service S1, a web browsing service S2, an electronic mail service S3, and a voice service S4. For each of the above services, the table gives:

a parameter P1 corresponding to the number of users simultaneously active in the uplink direction, a parameter P2 corresponding to the number of users simultaneously active in the downlink direction, a parameter P3 corresponding to the type of service (circuit or packet), a parameter P4 corresponding to the bit rate (in kbit/s) required by users active simultaneously in the uplink direction, and a parameter P5 corresponding to the bit rate (in kbit/s) required by users active simultaneously in the downlink direction.

Figure 3:
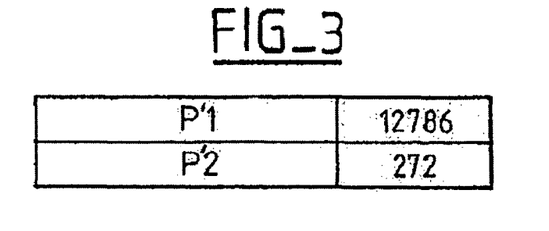

The table in FIG. 3 give one example of a traffic profile for the Iub logical link. This traffic profile assumes that the Node B covers a single cell that is characterized by the cell traffic descriptor given in FIG. 2. The FIG. 3 table gives:

a parameter P'1 corresponding to the minimum bandwidth necessary for user traffic, necessary for dimensioning the user plane, and a parameter P'2 corresponding to the maximum number of users at the logical interface, necessary for dimensioning the control plane.

Figure 4:
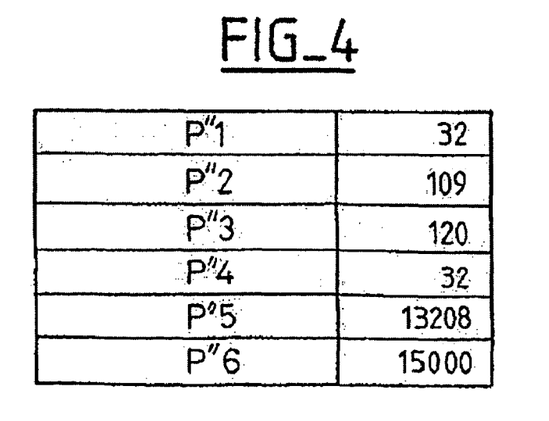

On the basis of the traffic profile obtained in this way, it is possible to choose a transport configuration template, for example from a predetermined set of transport configuration templates or reference templates. The FIG. 4 table gives an example of a transport configuration template obtained in this way. The table gives:

a parameter P'''1 corresponding to the bandwidth (in kbit/s) necessary for the virtual channels VC for the ALCAP protocol, a parameter P'''2 corresponding to the bandwidth (in kbit/s) necessary for the virtual channels VC for the NBAP-c protocol, a parameter P'''3 corresponding to the bandwidth (in kbit/s) necessary for the virtual channels VC for the NBAP-d protocol, a parameter P'''4 corresponding to the bandwidth (in kbit/s) necessary for the virtual channels VC for Node B/RNC node synchronization, a parameter P'''1 corresponding to the bandwidth (in kbit/s) necessary for the virtual channels VC for the user data, and a parameter P'''6 corresponding to the total bandwidth necessary (in kbit/s).

In the present example of configuring an Iub logical link, the signaling relating to the radio network layer corresponds to the NBAP protocol, and a distinction is drawn between the NBAP-c protocol (where "c" refers to a common channel) and the NBAP-d protocol (where "d" refers to a dedicated channel). A common channel is a channel shared between different users and a dedicated channel is a channel assigned specifically to a given user.

The configuration template chosen is in particular whichever of the reference templates for which the parameters P'''1, P'''2, P'''3 best match the traffic profile parameter P'2 and the parameter P'''5 best matches the traffic profile parameter P'1.

Depending on the logical link considered, other examples of protocols or of assignment of bandwidth to the various traffics liable to be transmitted on the logical link can be considered.

Figure 5:
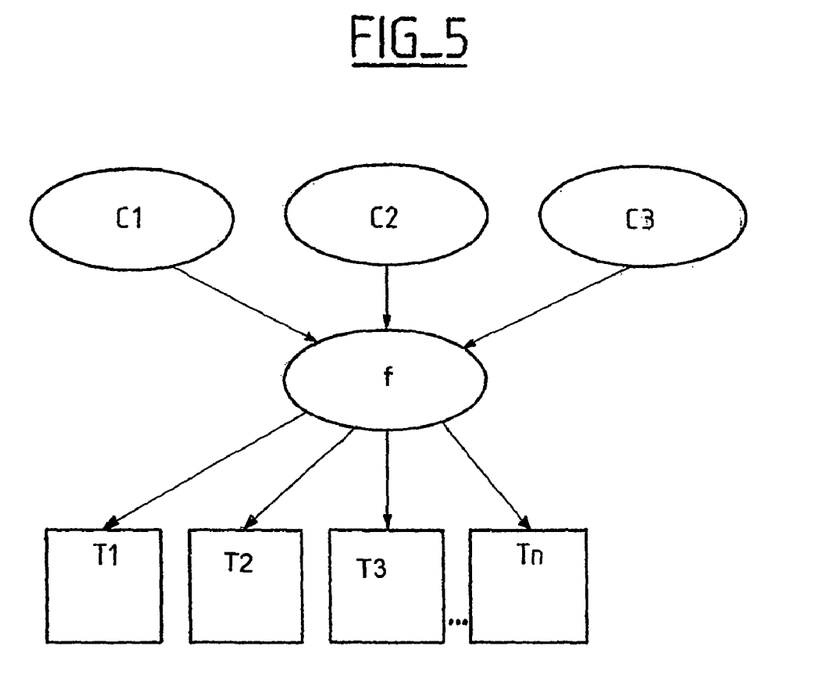

More generally, as shown in FIG. 5, a method of the invention can include a step f of choosing a transport configuration template T, in particular from a predetermined set of transport configuration templates or reference templates T1, . . . , Tn, as a function of one or more criteria from a set of criteria including:

the user requirements in terms of radio traffic capacity: input criterion C1, the capacity of the network to handle the radio traffic: input criterion C2, and the transport quality of service: input criterion C3.

The step f) is preferably executed automatically, by applying an appropriate algorithm.

During initial dimensioning, the transport configuration can be chosen as a function of criteria such as C1 and C2, i.e. as a function of the user requirements in terms of radio traffic capacity and the capacity of the network to handle the radio traffic.

Thereafter, during dimension optimization after commissioning, the transport configuration can be adapted as a function of criteria such as C1 and/or C2 and/or C3, and a new and more suitable transport configuration can be chosen in the case of a change (in particular a significant change) in radio traffic and/or a change in the capacity of the network to handle the radio traffic and/or a change (in particular a significant change) in the transport QoS. Such changes are preferably detected automatically.

A change in the capacity of the network to handle the radio traffic corresponds in particular to a change in cellular radio dimensions and/or in the capacity of the network nodes to handle the local traffic (for example, for a Node B, addition of a carrier, baseband processing card, etc.).

A significant change in the radio traffic is detected in particular from radio traffic measurements, for example based on traffic information contained in signaling messages conforming to the protocols of the radio network layer (application protocol RANAP, RNSAP or NBAP, depending on the logical link concerned, or Iu frame protocol, Iur frame protocol or Iub frame protocol, depending on the logical link concerned), or by means of counters providing information on the traffic at the various interfaces.

A significant change in the transport QoS is in particular detected from transport QoS measurements, such as in particular ATM cell or packet loss rate, waiting time, queue filling level, etc. measurements.

Moreover, the predetermined or reference configuration templates can advantageously themselves be optimized when optimizing the dimensions. In particular, the reference templates can be adapted dynamically as a function of the transport traffic capacity requirements (which can themselves be determined by either of the methods previously described). In particular, new reference templates can be created, for example by modifying one or more existing reference template parameters, as a function of criteria such as in particular the criteria C1 and/or C2 and/or C3 previously indicated.

For example, in the case of dimensioning the transport configuration of an Iub logical link:

initially, two reference templates can be provided, namely a template T1 in which a parameter corresponding to the bandwidth necessary for the NBAP protocol is equal to 100 kbit/s and a template T2 in which a parameter corresponding to the bandwidth necessary for the NBAP is equal to 200 kbit/s, and subsequently, as a function of the criteria C1 and/or C2 and/or C3 previously indicated, it can be estimated, for example, that an optimized value of that parameter corresponds to 120 kbit/s, and a new reference template T'1 can be created automatically in which this parameter has the value of 120 kbit/s.

A method of the invention is used in particular in an Operation and Maintenance Center (OMC) for a mobile radio network. To implement this kind of method, the OMC receives from the network elements of the RAN information necessary for dynamically adapting the transport configuration (as previously described), and the result of this, namely a new and more suitable transport configuration, can be offered automatically to the operator, for example.

The present invention therefore also provides an operation and maintenance center for a mobile radio network comprising means for implementing a method of the above kind. Such means can use either of the methods previously described; their particular implementation presenting no particular problem for the person skilled in the art, such means do not need to be described here in more detail than by stating their function, as previously.

The invention claimed is:

1. A method of dimensioning a transport network for a radio access network of a mobile radio network implemented in a mobile radio network operation and maintenance center comprising means for executing said method which comprises:
    determining transport traffic capacity requirements; and dynamically adapting a transport configuration as a function of the determined transport traffic capacity requirements which comprises:
    expressing requirements of users in terms of radio traffic capacity in a cell attached to a logical link of a transport network by a traffic descriptor for a corresponding cell,
    expressing traffic capacity requirements on a corresponding logical link of the transport network by a traffic profile, based on traffic descriptors for all of the cells attached to said corresponding logical link, and
    choosing a transport configuration template for the corresponding logical link of the transport network, based on the traffic profile for said corresponding logical link; and
    dynamically adapting a transport configuration as a function of the determined transport traffic capacity requirements.

2. The method according to claim 1, wherein the transport configuration template is chosen based on one or more criteria from a set of criteria including: radio traffic capacity requirements of users, a capacity of the transport network to handle radio traffic, and a transport quality of service.

3. The method according to claim 2, further comprising determining the radio traffic capacity requirements of users, based at least on one of: radio traffic forecasts during initial dimensioning of the transport network, and observations of the radio traffic of the transport network, subsequently, after commissioning of the transport network.

4. The method according to claim 2, further comprising determining the capacity of the transport network to handle the radio traffic, based on: forecasts of cellular radio dimensions and a capacity of network nodes to process the radio traffic, during initial dimensioning of the transport network, and at least one of changes in the cellular radio dimensions and the capacity of the network nodes to process the radio traffic subsequently, after commissioning of the transport network.

5. The method according to claim 4, wherein:
    the cellular radio dimensions are based on at least a number of cells and a number of carriers, and
    the capacity of the network nodes to process the radio traffic is based at least on a number of equipment cards.

6. The method according to claim 2, further comprising includes determining the capacity of the transport network to handle radio traffic, based on forecasts of cellular radio dimensions and a capacity of network nodes to process the radio traffic, during initial dimensioning of the transport network, and at least one of changes in the cellular radio dimensions and the capacity of the network nodes to process the radio traffic subsequently, after commissioning of the transport network.

7. The method according to claim 2, further comprising determining the capacity of the transport network to handle radio traffic, based on: forecasts of cellular radio dimensions that are based on at least a number of cells and a number of carriers, and a capacity of network nodes to process the radio traffic that is based at least on a number of equipment cards.

8. The method according to claim 1, wherein determining includes:
    determining the transport traffic capacity requirements during initial dimensioning of transport network based on forecasts of the radio traffic capacity requirements of users and a capacity of the transport network to handle the radio traffic.

9. The method according to claim 8, further including:
    determining the transport traffic capacity requirements after commissioning of the transport network based on at least one of radio traffic capacity requirements of users, a capacity of the network to handle the radio traffic, and a transport quality of service.

10. The method according to claim 1, wherein the traffic descriptor is defined by one or more parameters including, for each of uplink and downlink directions: a number of users active simultaneously in said cell, a type of service required by said users, wherein the service includes a circuit or a packet service, and a bit rate for the services required by said users.

11. The method according to claim 1, wherein the transport traffic profile of the corresponding logical link is defined by one or more parameters including: a minimum bandwidth required for dimensioning a user plane for communications protocols used on said corresponding logical link, and a maximum number of users for dimensioning a control plane for the communications protocols used on said corresponding logical link.

12. The method according to claim 1, wherein the transport configuration template for the corresponding logical link is defined by one or more parameters including: a bandwidth required for said corresponding logical link, and, an assignment of said bandwidth to a logical link traffic to be transmitted on said corresponding logical link, the logical link traffic including user data traffic, signaling traffic related to a radio network layer, and signaling traffic related to a transport network layer, in accordance with communications protocols used on said corresponding logical link.

13. The method according to claim 1, wherein determining includes:
   determining the transport traffic capacity requirements on a respective logical link of the transport network based on the transport traffic capacity requirements on one or more other logical links of the transport network.

14. The method according to claim 13, further including:
   determining the transport traffic capacity requirements on the respective logical link in proportion to the transport traffic capacity requirements on the other logical links.

15. The method according to claim 1, wherein choosing the transport configuration template comprises: choosing the transport configuration template based on a sum of the traffic descriptors for the cells attached to the corresponding logical link as:

$$T = f(\text{Sum } c1)$$

in which:
T is the transport configuration template,
Sum c1 represents the sum of the traffic descriptors $c_i$ for all of the cells attached to said corresponding logical link, and
f represents a function for deducing the transport configuration template T from the traffic descriptors $c_i$ of the cells attached to said corresponding logical link.

16. The method according to claim 1, wherein expressing the traffic capacity requirements and choosing the transport configuration template are based on an aggregate traffic of all of the cells attached to said corresponding logical link.

17. The method according to claim 1, wherein said transport configuration template is chosen from a set of predetermined transport configuration templates or reference templates.

18. The method according to claim 17, further including dynamic adaptation of the reference templates as a function of the transport traffic capacity requirements.

19. A mobile radio network operation and maintenance center configured to dimension a transport network of a radio access network of a mobile radio network by;
   determining transport traffic capacity requirements which comprises:
   expressing requirements of users in terms of radio traffic capacity in a cell attached to a logical link of a transport network by a traffic descriptor for a corresponding cell,
   expressing traffic capacity requirements on a corresponding logical link of the transport network by a traffic profile, based on traffic descriptors for all of the cells attached to said corresponding logical link, and
   choosing a transport configuration template for the corresponding logical link of the transport network, based on the traffic profile for said corresponding logical link; and
   dynamically adapting a transport configuration as a function of the determined transport traffic capacity requirements.

* * * * *